(12) United States Patent  
Barcala

(10) Patent No.: US 9,794,518 B2  
(45) Date of Patent: Oct. 17, 2017

(54) METHOD AND SYSTEM FOR CONVERTING PRIVACY ZONE PLANAR IMAGES TO THEIR CORRESPONDING PAN/TILT COORDINATES

(75) Inventor: Sergio Barcala, Coconut Creek, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 1516 days.

(21) Appl. No.: 12/909,502

(22) Filed: Oct. 21, 2010

(65) Prior Publication Data

US 2012/0098965 A1 Apr. 26, 2012

(51) Int. Cl.
*H04N 7/18* (2006.01)
*G08B 13/196* (2006.01)

(52) U.S. Cl.
CPC ......... *H04N 7/18* (2013.01); *G08B 13/19686* (2013.01); *G08B 13/19689* (2013.01)

(58) Field of Classification Search
None
See application file for complete search history.

(56) References Cited

U.S. PATENT DOCUMENTS

| 5,691,765 | A | * | 11/1997 | Schieltz | G08B 13/19619 |
| | | | | | 348/218.1 |
| 6,509,926 | B1 | | 1/2003 | Mills et al. | |
| 6,744,461 | B1 | * | 6/2004 | Wada | H04N 7/18 |
| | | | | | 348/143 |
| 7,366,359 | B1 | | 4/2008 | Davey et al. | |
| 7,382,936 | B2 | | 6/2008 | Yajima | |
| 2002/0008758 | A1 | | 1/2002 | Broemmelsiek et al. | |
| 2005/0129272 | A1 | | 6/2005 | Rottman | |
| 2005/0270371 | A1 | | 12/2005 | Sablak | |

(Continued)

FOREIGN PATENT DOCUMENTS

| CN | 101803384 A | 8/2010 |
| WO | 0162006 A2 | 8/2001 |
| WO | 01/68540 A2 | 9/2001 |

OTHER PUBLICATIONS

International Search Report and Written Opinion dated Jan. 31, 2012 for International Application Serial No. PCT/US2011/056172, International Filing Date: Oct. 13, 2011 consisting of 10-pages.

(Continued)

*Primary Examiner* — Kate Luo
(74) *Attorney, Agent, or Firm* — Christopher & Weisberg, P.A.

(57) ABSTRACT

A method and system for converting privacy zone corner points in a still image to PTZ coordinates using the equations for distance along the great circles of a sphere, where the sphere is defined along the pan-tilt axes of a PTZ camera with radius equal to the focal length of the image. The method includes receiving planar coordinate data defining a plurality of privacy zone corner points, the planar coordinate data taken from a still image, converting each privacy zone corner point to corresponding spherical coordinates, converting each of the corresponding spherical coordinates to corresponding PTZ coordinates, and storing the corresponding PTZ coordinates in a storage device. The stored PTZ coordinates may then be transmitted to a computer monitor. The motor of the PTZ camera moves the camera according to the PTZ coordinates until the privacy zone corner points appear at the substantial center of the monitor screen.

20 Claims, 5 Drawing Sheets

(56) References Cited

U.S. PATENT DOCUMENTS

| | | |
|---|---|---|
| 2005/0270372 A1 | 12/2005 | Henninger, III |
| 2005/0275723 A1 | 12/2005 | Sablak et al. |
| 2006/0056056 A1 | 3/2006 | Ahiska et al. |
| 2006/0187237 A1 | 8/2006 | Park |
| 2006/0192853 A1 | 8/2006 | Lee |
| 2006/0284971 A1* | 12/2006 | Wren ............... H04N 5/232 348/36 |
| 2007/0115356 A1 | 5/2007 | Kang et al. |
| 2008/0036860 A1 | 2/2008 | Addy |
| 2008/0055409 A1 | 3/2008 | Mars et al. |
| 2008/0136910 A1 | 6/2008 | Berkey et al. |
| 2008/0211903 A1 | 9/2008 | Davey et al. |
| 2009/0015670 A1 | 1/2009 | Gopinath et al. |
| 2010/0033567 A1* | 2/2010 | Gupta ............ H04N 17/002 348/143 |
| 2010/0141767 A1* | 6/2010 | Mohanty .......... H04N 7/181 348/159 |

OTHER PUBLICATIONS

1st Chinese Office Action and Search Report in both Chinese and its English translation dated Oct. 27, 2015 for corresponding Chinese National Stage Application Serial No. 201180050815.5, consisting of 13 pages.

1st Australian Examination Report dated May 26, 2014 for corresponding Australian Application Serial No. 2011318374, Australian Filing Date: Oct. 13, 2011, consisting of 3 pages.

Chinese Office Action and English translation thereof dated Aug. 10, 2017 issued in corresponding Chinese Application No. 201180050815.5, consisting of 17 pages.

* cited by examiner

METHOD AND SYSTEM FOR CONVERTING PRIVACY ZONE PLANAR IMAGES TO THEIR CORRESPONDING PAN/TILT COORDINATES

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates to video security systems and more specifically to a method and system for converting privacy zone corner points in a still planar video image to corresponding security camera pan/tilt/zoom coordinates.

BACKGROUND OF THE INVENTION

In today's world, people are more and more concerned with the protection of their civil liberties. The proliferation of security cameras in malls, retail stores, gyms, changing rooms, and apartment complex lobbies only serves to heighten their concerns. Fortunately, when monitoring an area for security purposes, technology exists that allows certain parts of the security camera's field of view to be kept private. The ability to "mask" certain areas of a camera's field of view, such as, for example, a window of a house is included in many security camera systems. The areas that are masked off are referred to as "privacy zones". Wide-area security cameras now provide the ability to mask off privacy zones thus prohibiting certain areas from being monitored and/or recorded. Without privacy zones, security personnel would have the ability to spy on members of the public without their consent.

Analog Pan/Tilt/Zoom ("PTZ") dome cameras currently include features to mask selected privacy zones in the camera's field of view. In these analog dome cameras, the privacy zone corners are defined by moving the pan-tilt motor until the center of the analog video screen reaches each privacy zone corner. Each corner is then represented by the pan-tilt coordinate where the corner would be at the center of the video screen. However, with the advent of digital Internet Protocol ("IP") dome cameras, instead of an analog video output, a stream of compressed digital data is used to transfer the camera video images. A graphical user interface such as a browser web page is used to display the video image stream by uncompressing the received digital data. It is desirable to define the privacy zone corners on the browser page using one still video image obtained from the received stream.

However, as the privacy zone corners are drawn on the still video image, methods must be used to convert the drawn points on the planar image to the IP dome camera's pan-tilt-zoom ("PTZ") motor coordinates, at which these corners would be situated at the substantial center of the video screen. With the pan-tilt coordinates for each privacy zone corner, the PTZ dome camera's privacy zone algorithm must draw the privacy zone coverage areas on the received live video before it is compressed into digital data and streamed. However, there is currently no adequate method and system for converting privacy zone points taken from a captured still video image to their corresponding pan-tilt coordinates.

Therefore, what is needed is a system and method for converting privacy zone points taken from a captured still video image to their corresponding pan-tilt coordinates, which are the coordinates to which PTZ dome camera uses to define the privacy zone.

SUMMARY OF THE INVENTION

The present invention advantageously provides a method and system for converting privacy zone corner points in a still image to PTZ coordinates using the equations for distance along the great circles of a sphere, where the sphere is defined along the pan-tilt axes of a PTZ camera with radius equal to the focal length of the image.

In one aspect of the invention, a method for establishing a privacy zone in a video security system is provided. The method includes receiving planar coordinate data defining a plurality of privacy zone corner points, the planar coordinate data taken from a still image; converting each privacy zone corner point to corresponding spherical coordinates; converting each of the corresponding spherical coordinates to corresponding pan/tilt coordinates; and storing the corresponding pan/tilt coordinates in a storage device.

In another aspect of the invention, a camera surveillance system is provided. The camera surveillance system includes a pan/tilt/zoom (PTZ) camera assembly for obtaining a still image and a processor in communication with the PTZ camera assembly. The processor performs the steps of receiving planar coordinate data, the planar coordinate data defining a plurality of privacy zone corner points, the planar coordinate data taken from the still image; converting each privacy zone corner point to corresponding spherical coordinates; and converting each of the corresponding spherical coordinates to corresponding pan/tilt coordinates. The camera surveillance system also includes a storage device for storing the corresponding pan/tilt coordinates.

In yet another aspect, a computer program product is provided where the computer program product stores a computer program which when executed performs a method for converting a privacy zone point on a still image to its corresponding pan tilt coordinates. The method includes the steps of receiving planar coordinate data defining a plurality of privacy zone corner points, the planar coordinate data taken from the still image; converting each privacy zone corner point to corresponding spherical coordinates; converting each of the corresponding spherical coordinates to corresponding pan/tilt coordinates; and storing the corresponding pan/tilt coordinates in a storage device.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
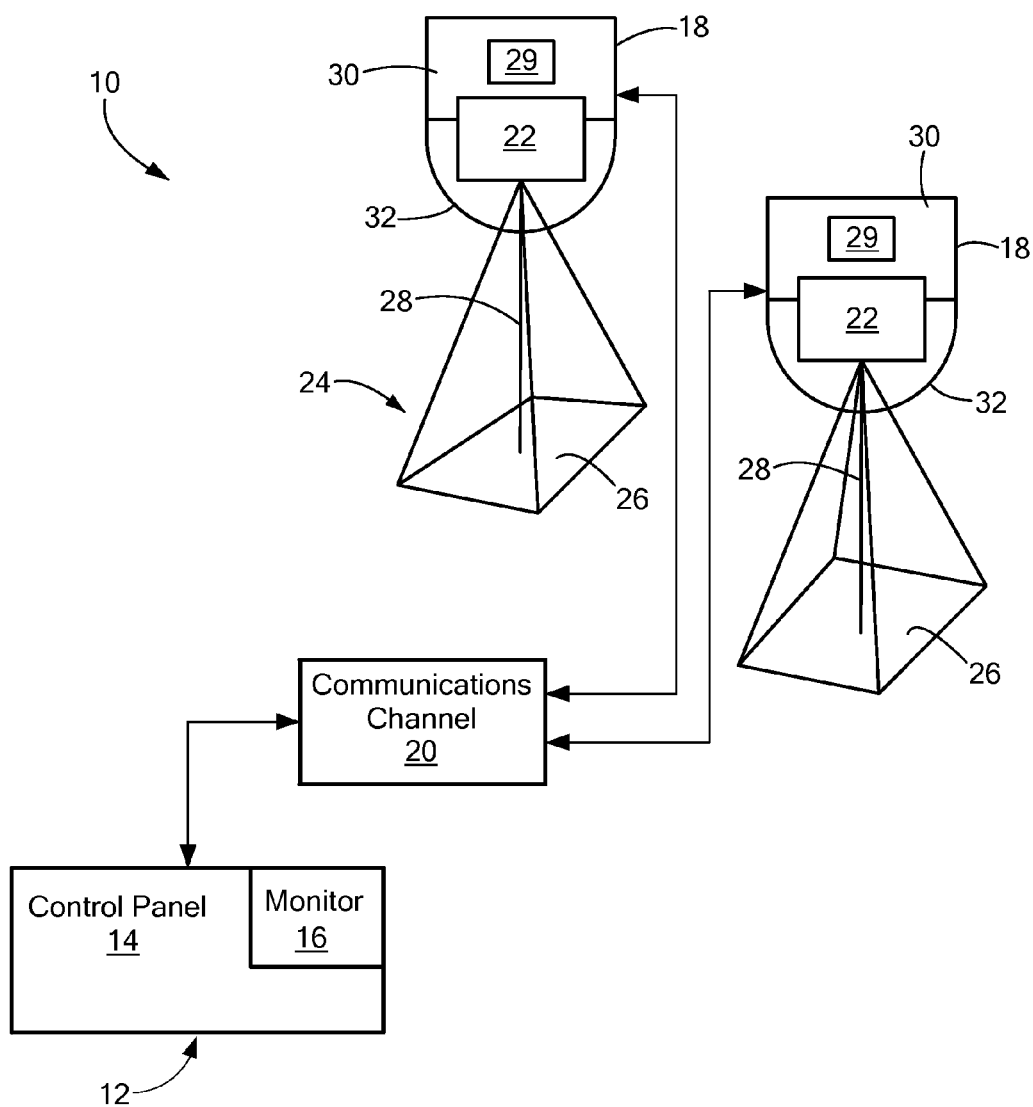
FIG. 1 is a block diagram of an exemplary video surveillance system utilizing a method and system to convert privacy zones in accordance with the principles of the present invention.

Before describing in detail exemplary embodiments that are in accordance with the present invention, it is noted that the embodiments reside primarily in combinations of apparatus components and processing steps related to implementing a system and method for converting privacy zones in a still video image captured by a pan/tilt/zoom ("PTZ") camera to their corresponding pan tilt coordinates. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

One embodiment of the present invention advantageously provides a method and system for converting privacy zone corner points in a still planar video image to PTZ dome coordinates using the equations for distance along the great circles of a sphere, where the sphere is defined along the pan-tilt axes with radius equal to the focal length of the image. The method and system converts privacy zones on a planar image from its planar coordinates to corresponding pan-tilt spherical coordinates, where the planar coordinates correspond to a still video image taken by the spherical view of a PTZ dome camera. The planar image conceptually appears on the surface of the sphere defined by the camera view field and its focal length. Once the privacy zone points are converted to PTZ coordinates, these points are stored. The motor of the PTZ dome camera can then move the camera according to the stored pan tilt zoom coordinates until the privacy zone point appears at the substantial center of a viewing screen.

Referring now to the drawing figures in which like reference designators refer to like elements, there is shown in FIG. 1 an exemplary configuration of a camera surveillance system 10 constructed in accordance with the principles of the present invention. As shown in FIG. 1, a camera surveillance system 10 comprises an operator console 12 having a control panel 14 and a monitor 16. Signals pass between the operator console 12 and a plurality of surveillance devices 18 over a communications channel 20.

The surveillance devices 18 each include a camera and lens assembly 22. Each camera and lens assembly 22 views an area of a location 24 which may be remote from the operator location and is in the Field Of View ("FOV") 26 and along the viewing axis 28 of the assembly. Each image is converted by the respective camera and lens assembly 22 into an electrical video signal which is supplied to the monitor 16 of the operator console 12 over the communications channel 20. Communications channel 20 can be a wired or wireless connection. In an embodiment of the invention, the wireless connection is part of an Internet Protocol ("IP") network such as the Internet where image and video data captured by assembly 22 is converted to a digital format and transmitted wirelessly where it can be viewed on monitor 16 at control panel 14. In this embodiment, control panel 14 accesses assembly 22 by using an installed browser and receives the captured image data by using HyperText Transfer Protocol ("HTTP"). The captured image of location 24 can then be viewed on monitor 16, for example as a web page.

As shown in FIG. 1, each surveillance device 18 may include an upper housing 30 which is fixedly secured to the location 24 and to which the camera and lens assembly 22 is mounted. A dome-like cover 32 closes the open end of the housing and is of a character which permits the passage of light so that the enclosed assembly 22 can view the location. In one embodiment, surveillance device 18 includes a computer 29, which includes the necessary software and hardware, i.e., a processor, memory, data storage device and transmission circuitry to convert points on captured images to their corresponding spherical coordinates and pan and tilt coordinates and to transmit a signal containing the image with applied pan and tilt coordinates along communication channel 20 to control panel 14, where it can be viewed on monitor 16. Computer 29 need not physically reside in surveillance device 18 and may be physically remote but in communication with surveillance device 18.

Figure 2:
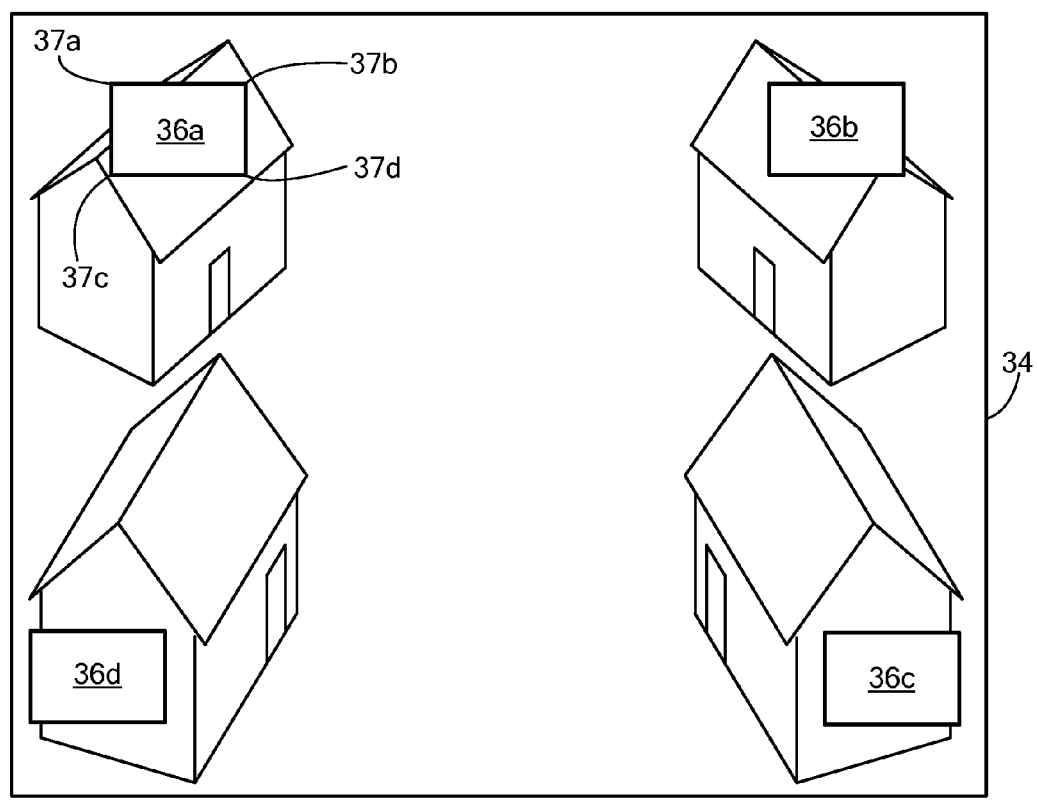
FIG. 2 is a diagram of an exemplary video image with privacy zones.

Referring to FIG. 2 and in accordance with the principles of the present invention, the surveillance device 18 is further adapted to define and establish areas of the viewed video image 34 corresponding to desired privacy zones 36 which are to be concealed from view. In these areas, the video image 34 is partially or totally obscured so as not to be visible or discernable to the operator viewing the video image on the monitor 16 of the console 14. In the embodiment illustrated in FIG. 2, four privacy zones 36a, 36b, 36c and 36d (referred to collectively herein as "privacy zones 36") appear on still video image 34. Each privacy zone 36 is defined by four corners. For example, privacy zone 36a is defined by privacy zone corners 37a, 37b, 37c and 37d. The use of the four corners of a rectangular-shaped privacy zone 36 is merely exemplary. Other privacy zone shapes may also be used.

In the embodiment shown in FIG. 1, instead of a signal representing analog video, a stream of compressed digital data is used to transfer the camera video images to console 12. A Web page interface may be used to display the video image stream by uncompressing the received digital data. Each privacy zone corner 37a, 37b, 37c and 37d represented by its Cartesian coordinates on the still video image is converted to its corresponding pan/tilt coordinates and these coordinates applied to the still video image. A signal representing the still image with applied pan/tilt privacy zone coordinates can then be transmitted to a viewing screen, thus allowing an operator to use a graphical user interface to highlight a desired privacy zone. Such can be accomplished, for example, by using a mouse to highlight a box around the desired privacy zone such that the corners of the box represent the privacy zone corners 37a, 37b, 37c and 37d.

Many existing security systems allow privacy zones to be established by accepting an input, e.g., button press, when the privacy zone corner appears at the center of the display screen of a live image. These corners, however, are represented by pan/tilt coordinates and are stored as such. The present invention allows the use of a captured digitized frame to establish the privacy zone 36 and provides a method for converting the Cartesian coordinates of the privacy zone corners 37a, 37b, 37c and 37d to their corresponding pan/tilt coordinates such that they are virtually located at the center of what would be the corresponding live image. This arrangement allows the security system to use a captured digitized frame and computer display to establish privacy zones 36 using existing security system video cameras. As a result, present invention provides a method to apply the privacy zones corners 37a, 37b, 37c and 37d on the received live video before it is compressed into digital data and streamed to control panel 14.

As described above, privacy zones 36 are drawn on a still video image captured by the camera assembly 22. Each privacy zone 36 corresponds to a regular geometric shape, usually a rectangle. Corner points 37a, 37b, 37c and 37d are then selected for each privacy zone 36. Each of the corner points 37a, 37b, 37c and 37d from the planar coordinates of the still image is converted to pan-tilt-zoom ("PTZ") spherical coordinates. The present invention performs this conversion by first accurately converting from planar coordinates to spherical coordinates, where the planar coordinates correspond to a still image conceptually on the surface of a sphere representing the view field of the PTZ camera at a given focal length.

Figure 3:
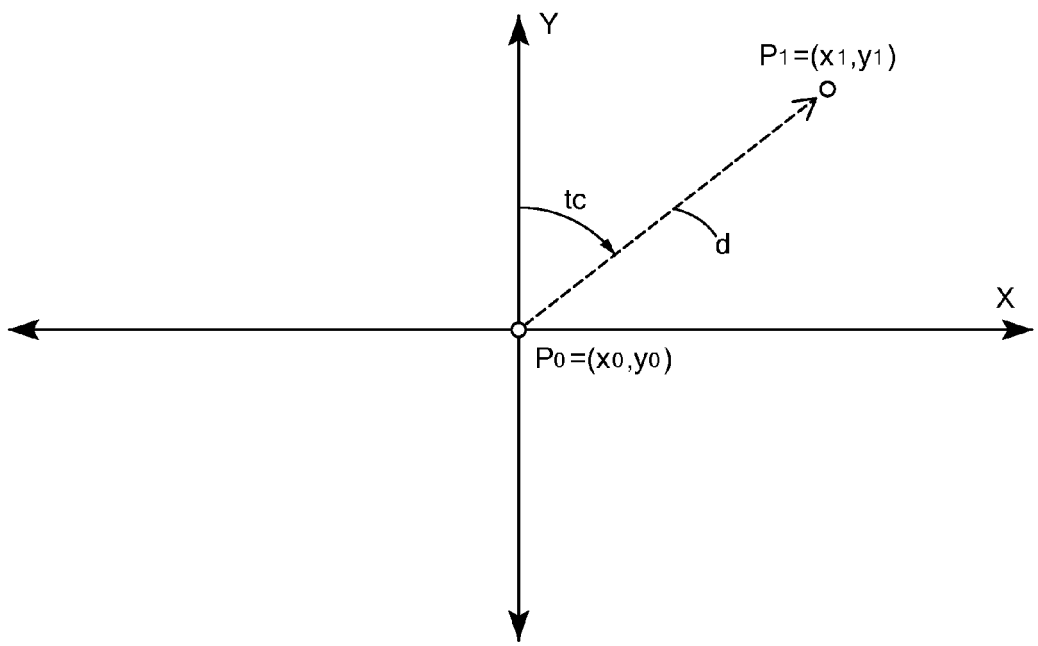
FIG. 3 is a diagram of a privacy zone corner point on a video image plane.

The size of the planar still image is defined by the horizontal and vertical field of view in degrees at the camera's zoom factor of 1× and the camera's current zoom magnification factor. The center of the still image corresponds to the current pan and tilt coordinates of the pan/tilt motor of camera assembly 22. Referring to FIG. 3, the image center is considered the origin for a Cartesian plane and may be indicated by the point $P_0=(x_0,y_0)$. Any point $P_1$ on the image, such as a point representing a privacy zone corner 37a, 37b, 37c and 37d, can be located given its Cartesian coordinates $P_1=(x_1,y_1)$ as shown in FIG. 3, where the units are image pixels. The point $P_1=(x_1,y_1)$ must be translated to its equivalent point $P_1=(r_1, \phi_1, \theta_1)$ on the surface of a sphere, which is then converted to corresponding pan and tilt coordinates. As will be described in greater detail below, the distance "d" from point $P_0$ to $P_1$ and angle the "tc" from the vertical Y-axis to a straight line from point $P_0$ to point $P_1$ will be used in the conversion process.

Figure 4:
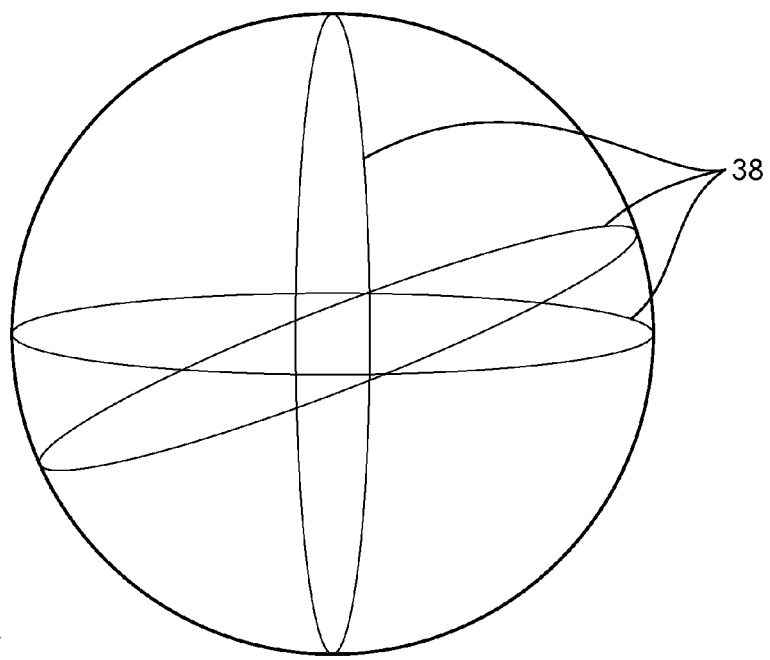
FIG. 4 is a diagram of great circles on a sphere, used in accordance with the principles of the present invention.
Figure 5:
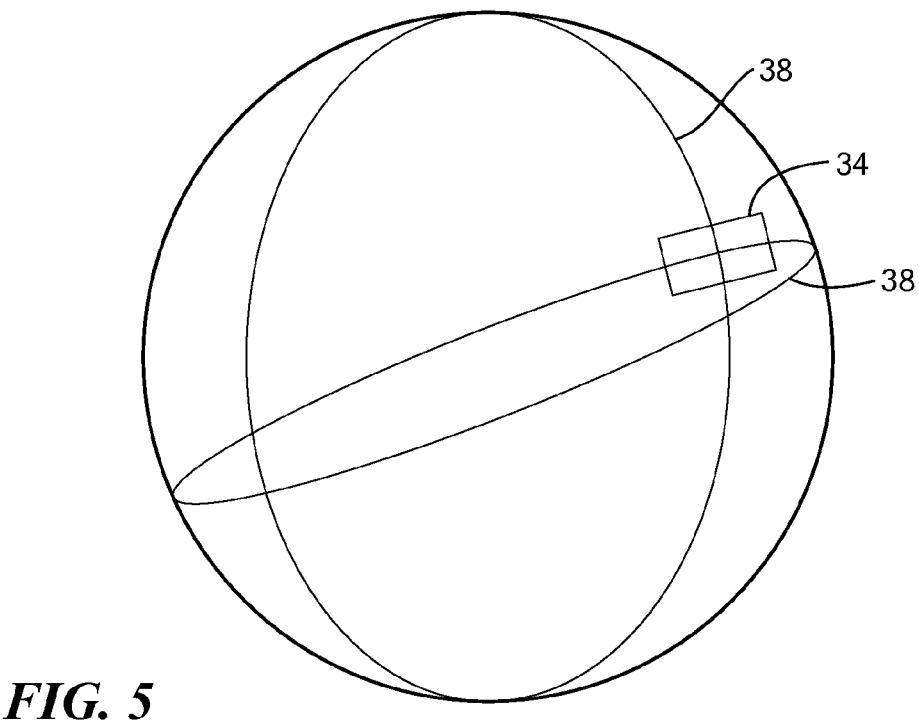
FIG. 5 is a diagram of a video image on a sphere with great circles representing x and y coordinates in accordance with the principles of the present invention.

Thus, given a point $P_1=(x_1,y_1)$ on the image, where point $P_1$ represents a point on the captured still video image representing a privacy zone corner 37a, 37b, 37c and 37d, the present invention converts this point to its corresponding pan and tilt coordinates, that is, to the coordinates to which the motor of camera assembly 22 needs to move in order to have this point appear as the image center on monitor 16. The inventive method provides a variation of the formulas for distances on the surface of a sphere along the great circles 38 of the sphere as shown in FIG. 4. In this embodiment, the sphere radius is equal to the focal length of the video image, which is defined as the image field of view at zoom 1× divided by the current zoom magnification. The x and y planar coordinates (as shown in FIG. 3) of the still video image 34 correspond to the great circles 38 passing through the center of the image. FIG. 5 shows the video image 34 on a sphere having great circles 38 representing the x and y coordinates.

The conversion method performed by the present invention is carried out by a processor located, for example, within computer 29. Computer 29 need not be physically located within assembly 22. The method performed by the processor converts the still video image taken by camera assembly 22 from an initial state, that is, a planar image of location 24 with one or more privacy zones 36, to a second state, that is, a representation of the planar video image on a spherical view of a PTZ dome camera. The initial step performed by the method of the present invention includes calculating the distance "d" from the origin ($P_0$) to point $P_1$ on the x-y plane and calculating the angle "tc" from the vertical axis to a straight line from the origin ($P_0$) to point $P_1$. Then, the equations for distance along the surface of the sphere are used to derive the location of the point $P_1$ in spherical coordinates.

The inventive method assumes that distances and angles on the planar plane are equal to distances and angles on the surface of the sphere with a focal length equal to the radius of the sphere. This assumption approaches maximum accuracy as the focal length increases with large zoom magnifications. At small zoom magnifications, the camera block may distort the image in a way that makes the distances on the view sphere surface translate to a planar view with some distortion resulting in fish eye effects. However, in order to reduce distortion, a correction factor may be added when needed. For example, in a 35x camera block, the horizontal distance x is corrected with the following correction factor: $x'=x*(1+\sin^2(\alpha/2))$, where $\alpha=a\tan(x/r)$. The units for planar distances may be in pixels. The correction factor does not depend on the units used as long as the conceptual sphere radius (r), defined as the focal length, uses the same units. The conversion process disclosed herein can be suitably run on a central processing unit ("CPU") with a floating point library in non-real-time mode. For real-time situations, such as during privacy zone drawing, a less CPU-intensive solution, with correspondingly less accuracy, may be used.

The present invention converts planar coordinates to pan-tilt-zoom motor coordinates by first converting the planar coordinates of the privacy zones corners 37a, 37b, 37c and 37d to spherical coordinates. The spherical coordinates are then converted to corresponding PTZ motor coordinates. Thus, point $P_1=(x_1,y_1)$, which represents the location of one of privacy zone corner 37a, 37b, 37c and 37d in planar coordinates is converted first to spherical coordinates and from spherical coordinates to pan-tilt motor coordinates.

Figure 6:
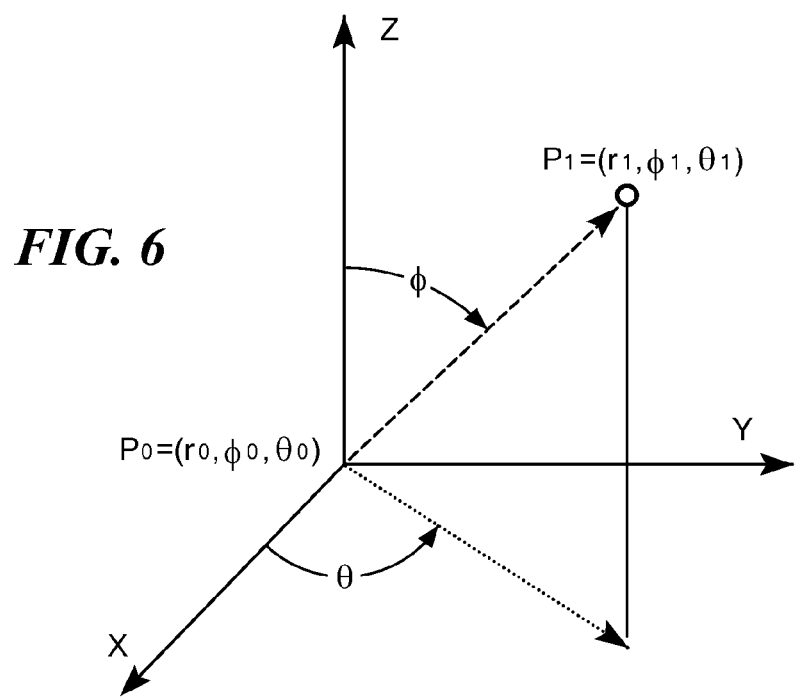
FIG. 6 is a diagram of a spherical coordinate system used to convert planar privacy zones to their spherical coordinates according to the principles of the present invention.

Referring to the Cartesian coordinate system of FIG. 3 and the spherical coordinate system of FIG. 6, the multiple-step privacy zone conversion process will now be described. The initial step calculates the distance from the origin $P_0=(x_1, y_1)$ to point $P_1=(x_1, y_1)$ on the Cartesian coordinate system, where $P_1$ represents a privacy zone corner 37a, 37b, 37c and 37d. Using the Pythagorean theorem, distance $d=\mathrm{sqrt}(x_1^2+y_1^2)$. The next step is to calculate the angle (tc) from the vertical line y to a line drawn from the origin $P_0$ to the point $P_1$. This is done pursuant to the following equation: $tc=a\tan(x_1/y_1)+\pi$, keeping $-\pi<=tc<=+\pi$. Therefore, if $(tc>\pi)$, then $tc=tc-2\pi$.

Once the distance from the origin to $P_1=(x_1, y_1)$ and the angle from the vertical line y to a line drawn from the origin $P_0$ to the point $P_1$ are calculated, given the pan and tilt coordinates of the image origin, the spherical coordinates for the origin $P_0=(r_0, \phi_0, \theta_0)$ are then calculated as follows: $\phi_0$=tilt (position of image center), where $-\pi/2<=\phi<=\pi/2$; $\theta_0$=pan (position of image center), where $0<\theta<2\pi$; and $r_0=((\text{screen\_width})*\text{zoom\_factor})/\text{Hfov}$. For this calculation, the following conventions are used: 0<pan<360 degrees, where pan 0 degrees is arbitrarily chosen, but fixed; 90<tilt<−90 degrees, where tilt 90 degrees is looking up, tilt−90 degrees is looking straight down; screen_width is the image width in pixels; screen_height is the image height in pixels; Hfov is the horizontal field of view at zoom factor 1×; Vfov is the version field of view at zoom factor 1×; and zoom_factor is the current image zoom magnification.

Finally, the spherical coordinates of point $P_1=(r_1, \phi_1, \theta_1)$ are calculated given the coordinates of the origin $P_0=(r_0, \phi_0, \theta_0)$, using distance d and angle tc calculated above. It should be noted that the range for $\phi$ matches the range for tilt and not the mathematical convention. When $\theta_1$ is within 180 degrees from $\theta_0$, the following formula (FORMULA A) is used: $\phi_1 = a\sin\{\sin(\phi_0)*\cos(d/r_0)+\cos(\phi_0)*\sin(d/r_0)*\cos(tc)\}$. If $abs(\cos(\phi_1))<LIM$, then $\theta_1=\theta_0$. Otherwise, $\theta_1 = \mod\{\theta_0 - a\sin(\sin(tc)*\sin(d/r_0)/\cos(\phi_1))+\pi, 2\pi\} - \pi$, $r_1=r_0$, where LIM equals a small number based on calculations minimum resolution such as, for example, 0.0001. The following formula (FORMULA B) is the general case for all values of $\theta_1$ and $\theta_0$ where PU is a small number such as 0.0001: $\phi_1 = a\sin\{\sin(\phi_0)*\cos(d/r_0)+\cos(\phi_0)*\sin(d/r_0)*\cos(tc)\}$, $\theta_2 = a\tan 2\{\sin(tc)*\sin(d/r_0)*\cos(\phi_0), \cos(d/r_0)-\sin(\phi_0)*\sin(\phi_1)\}$, $\theta_1 = \mod(\theta_0-\theta_2+PU, 2\pi)-\pi$, $\alpha v\delta r_1=r_0$.

In determining which formula to use, where $\delta=(Vfov*abs(y_1))/(zoom\_factor*screen\_Height)$ and LIM is defined as a small number based on calculations minimum resolution, the following guidelines are used. If $y_1>=0$, then FORMULA A disclosed above, is used. If $(\phi_0+\delta)<(\pi-LIM)$, then FORMULA A is also used. Otherwise, FORMULA B is used.

The above is based on the fact that the lowest tilt position is −90 degrees (full down position) and the maximum image field of view size is 90 degrees. That is, the difference between $\theta_1$ and $\theta_0$ is always less than 180 degrees except when looking down and selecting a point pass the full down position.

The spherical coordinates $P_1=(r_1, \phi_1, \theta_1)$ are converted to pan-tilt coordinates, where privacy zone corner pan=$\theta_1$, and privacy zone corner tilt=$\phi_1$. The obtained pan and tilt coordinates of each of privacy zones corner 37a, 37b, 37c and 37d are then transmitted to a camera where they can be stored as corner points. A user can then move the camera lens assembly 22 to each corner point.

Figure 7:
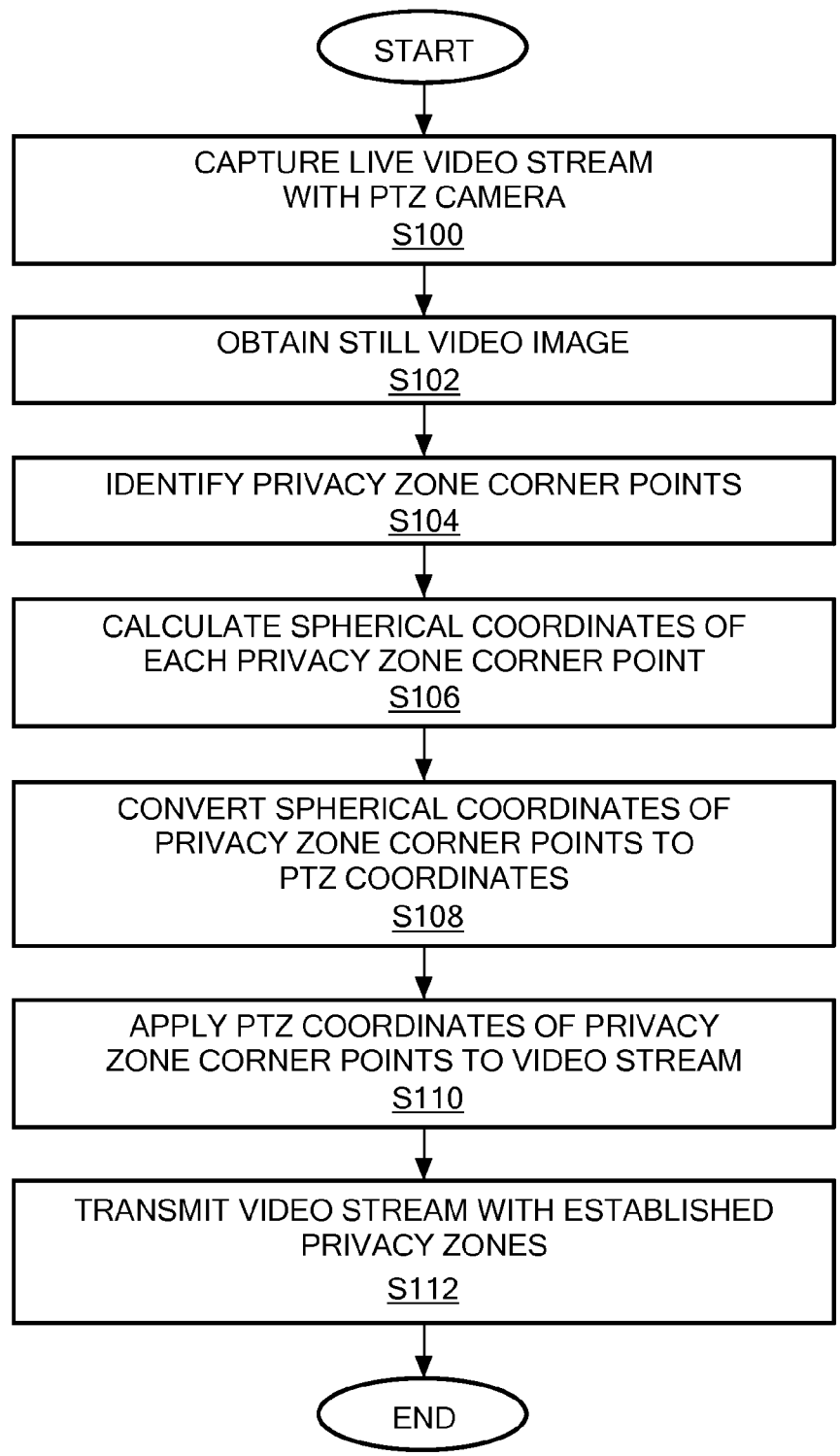
FIG. 7 is a flowchart illustrating an exemplary conversion method of the present invention.

FIG. 7 represents a series of steps performed by an exemplary embodiment of the present invention. A live video stream is captured by a PTZ camera (step S100). A still video image is then obtained from the captured live video stream (step S102). As described above, one or more privacy zone corner points 37a-37d are identified (step S104). As per the method described above, spherical coordinates are calculated for each identified privacy zone corner points 37a-37d (step S106). The spherical coordinates of each privacy zone corner point 37a-37d are converted to their corresponding PTZ coordinates and stored by the camera or a separate device, e.g., the display device or device performing the conversion (step S108). Once the conversion to PTZ coordinates takes place, these PTZ coordinates can be applied in the video stream transmission to create a privacy zone (step S110). The application of the privacy zone to the video stream can be performed by the camera, the display monitor (or display system) or an intermediate device that receives the video stream prior to display. The video stream, with the privacy zone(s), is then transmitted to a viewing screen on monitor 16, where the video image can be viewed on monitor, for example, a web page (step S112). The video image now contains each privacy zone 36 as established by corner points 37a-37d in which a predetermined method of obscuring the video in the privacy zone 36, e.g., blanking, defocusing, etc. is applied to the video stream.

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A method for establishing a privacy zone in a video security system, the method comprising:
    capturing a first video stream;
    obtaining a still image from the first video stream;
    receiving planar coordinate data corresponding to the privacy zone defined by a plurality of privacy zone corner points on the still image from the first video stream;
    converting each privacy zone corner point to corresponding points on a sphere based on an origin point, the points on the sphere and the origin point being defined by spherical coordinates, each of the spherical coordinates including a radius, a polar angle and an azimuth angle, where:
        if the azimuth angle between the point on the sphere and the origin point is less than 180 degrees, the radius of the point on the sphere is determined to be equal to the radius of the origin point; and
        if the azimuth angle between the point on the sphere and the origin point is not less than 180 degrees, the radius of the point on the sphere is determined to be equal to a multiple of the radius of the origin point, the multiple being based on at least one of a vertical field of view, a zoom factor, and a screen height;
    converting each of the corresponding spherical coordinates to corresponding pan/tilt coordinates;
    causing a motor of a Pan Tilt Zoom (PTZ) camera to move according to the corresponding pan/tilt coordinates such that the privacy corner points appear in a second video stream;
    capturing the second video stream after the motor of the PTZ camera is caused to move according to the pan/tilt coordinates;
    applying the privacy zone to the second video stream; and
    transmitting the second video stream with the applied privacy zone for display.

2. The method of claim 1, wherein the second video stream is transmitted to a video viewing device.

3. A method for establishing a privacy zone in a video security system, the method comprising:
receiving planar coordinate data defining a plurality of privacy zone corner points, the planar coordinate data taken from a still image, the still image having a focal length substantially equal to an image field of view at 1x zoom divided by a current zoom magnification, the focal length being equal to the radius of the sphere, each privacy zone corner point being defined by respective Cartesian coordinates x and y;
converting each privacy zone corner point to corresponding points on a sphere based on an origin point, the points on the sphere being defined by spherical coordinates, each of the spherical coordinates including a radius, a polar angle and an azimuth angle, where:
if the Cartesian coordinate y is one of greater than zero and equal zero, the radius of the point on the sphere is determined to be equal to the radius of the origin point; and
if the Cartesian coordinate y is less than zero, the radius of the point on the sphere is determined to be equal to a multiple of the radius of the origin point, the multiple being based on at least one of a vertical field of view, a zoom factor, and a screen height;
converting each of the corresponding spherical coordinates to corresponding pan/tilt coordinates; and
storing the corresponding pan/tilt coordinates in a storage device.

4. The method of claim 1, wherein the still image has a center point and converting each privacy zone corner point to points on the sphere defined by spherical coordinates comprises:
calculating a distance and an angular relationship between the center point of the still image and each privacy zone corner; and
calculating the spherical coordinates of each privacy zone point using the distance and angular relationship.

5. The method of claim 1, wherein the motor of the PTZ camera is caused to move according to the corresponding pan/tilt coordinates such that the privacy corner points appear at the substantial center of a video viewing device.

6. The method of claim 5, wherein the still image has a focal length, the focal length being equal to a radius of the sphere.

7. The method of claim 5, wherein converting each privacy zone corner point to points on the sphere defined by spherical coordinates comprises:
calculating the spherical coordinates of the privacy zone corner point by using equations for distance along the great circles of the sphere.

8. A camera surveillance system comprising:
a pan/tilt/zoom (PTZ) camera assembly configured to:
capture a first video stream;
obtain a still image from the first video stream;
a processor in communication with the PTZ camera assembly, the processor configured to:
receive planar coordinate data corresponding to the privacy zone defined by a plurality of privacy zone corner points on the still image from the first video stream;
covert each privacy zone corner point to corresponding points on a sphere based on an origin point, the points on the sphere and origin point being defined by spherical coordinates including a radial distance, a polar angle and an azimuth angle, where:
if the azimuth angle between the point on the sphere and the origin point is less than 180 degrees, the radius of the point on the sphere is determined to be equal to the radius of the origin point; and
if the azimuth angle between the point on the sphere and the origin point is not less than 180 degrees, the radius of the point on the sphere is determined to be equal to a multiple of the radius of the origin point, the multiple being based on at least one of a vertical field of view, a zoom factor and a screen height;
convert each of the spherical coordinates to corresponding pan/tilt coordinates;
cause a motor of a Pan Tilt Zoom (PTZ) camera to move according to the corresponding pan/tilt coordinates such that the privacy corner points appear in a second video stream;
the pan/tilt/zoom (PTZ) camera assembly further configured to:
capture the second video stream after the motor of the PTZ camera is caused to move according to the pan/tilt coordinates;
the processor is further configured to:
apply the privacy zone to the second video stream; and
cause transmission of the second video stream with the applied privacy zone for display.

9. The camera surveillance system of claim 8, further comprising a video viewing device in communication with the PTZ camera assembly over a communication channel, the video viewing device configured to receive the second video stream with applied privacy zone from the PTZ camera assembly.

10. The camera surveillance system of claim 8, the still image having a center point and wherein the processor is further configured to convert each privacy zone corner point to points on a sphere defined by spherical coordinates by:
calculating a distance and an angular relationship between the center point of the still image and each privacy zone corner; and
calculating the spherical coordinates of each privacy zone point using the distance and angular relationship.

11. The camera surveillance system of claim 8, wherein the motor of the PTZ camera is caused to move according to the corresponding pan/tilt coordinates such that the privacy corner points appear at the substantial center of a video viewing device.

12. The camera surveillance system of claim 11, wherein the still image has a focal length, the focal length being equal to a radius of the sphere.

13. The camera surveillance system of claim 11, wherein the processor is further configured to convert each privacy zone corner point to points on the sphere defined by spherical coordinates by calculating the spherical coordinates of the privacy zone corner point and using equations for distance along the great circles of the sphere.

14. The camera surveillance system of claim 9, wherein the video viewing device has a graphical user interface, and wherein the plurality of privacy zone corner points are selected using the graphical user interface.

15. A non-transitory computer readable medium storing a computer program which when executed performs a method for converting a privacy zone point on a still image to its corresponding pan tilt coordinates, the method comprising:
capturing a first video stream;
obtaining a still image from the first video stream;

receiving planar coordinate data corresponding to the privacy zone defined by a plurality of privacy zone corner points on the still image from the first video stream;

converting each privacy zone corner point to corresponding points on a sphere based on an origin point, the points on the sphere and the origin point being defined by spherical coordinates including a radial distance, a polar angle and an azimuth angle, where:

if the azimuth angle between the point on the sphere and the origin point is less than 180 degrees, the radius of the point on the sphere is determined to be equal to the radius of the origin point; and if the azimuth angle between the point on the sphere and the origin point is not less than 180 degrees, the radius of the point on the sphere is determined to be equal to a multiple of the radius of the origin point, the multiple being based on at least one of a vertical field of view, a zoom factor and a screen height;

converting each of the corresponding spherical coordinates to corresponding pan/tilt coordinates; and causing a motor of a Pan Tilt Zoom (PTZ) camera to move according to the corresponding pan/tilt coordinates such that the privacy corner points appear in a second video stream;

capturing the second video stream after the motor of the PTZ camera is caused to move according to the pan/tilt coordinates;

applying the privacy zone to the second video stream; and transmitting the second video stream with the applied privacy zone for display.

16. The non-transitory computer readable medium of claim 15, the still image including a center point and wherein converting each privacy zone corner point to points on a sphere defined by spherical coordinates further comprises:

calculating a distance and an angular relationship between the center point of the still image and each privacy zone corner; and calculating the spherical coordinates of each privacy zone point using the distance and angular relationship.

17. The non-transitory computer readable medium of claim 16, wherein the motor of the PTZ camera is caused to move according to the corresponding pan/tilt coordinates such that the privacy corner points appear at the substantial center of a video viewing device.

18. The non-transitory computer readable medium of claim 17, wherein the still image has a focal length, the focal length being equal to a radius of the sphere.

19. The non-transitory computer readable medium of claim 17, wherein converting each privacy zone corner point to points on the sphere defined by spherical coordinates comprises:

calculating the spherical coordinates of the privacy zone corner point by using equations for distance along the great circles of the sphere.

20. The non-transitory computer readable medium of claim 19, wherein converting each privacy zone corner point to points on the sphere defined by spherical coordinates further includes applying a correction factor to at least one of the x planar coordinate and the y planar coordinate.

* * * * *